US 6,748,453 B2
Jun. 8, 2004

(12) United States Patent
Law et al.

(10) Patent No.: US 6,748,453 B2
(45) Date of Patent: Jun. 8, 2004

(54) DISTRIBUTED APPLICATIONS IN A PORTABLE THREAD ENVIRONMENT

(75) Inventors: Hock Law, Carlsbad, CA (US); Suresh Singamsetty Kumar, San Diego, CA (US)

(73) Assignee: Microtune (San Diego), Inc., San Diego, CA (US)

( * ) Notice: Subject to any disclaimer, the term of this patent is extended or adjusted under 35 U.S.C. 154(b) by 355 days.

(21) Appl. No.: 09/852,316

(22) Filed: May 8, 2001

(65) Prior Publication Data

US 2002/0046231 A1 Apr. 18, 2002

Related U.S. Application Data

(63) Continuation-in-part of application No. 09/792,550, filed on Feb. 23, 2001.
(60) Provisional application No. 60/202,735, filed on May 8, 2000.

(51) Int. Cl.[7] .................................................. G06F 9/54

(52) U.S. Cl. ........................ 709/314; 709/103; 370/412

(58) Field of Search ................................ 709/100–108, 709/238–244, 313–315, 328; 370/412–418, 389, 397

(56) References Cited

U.S. PATENT DOCUMENTS

| 5,784,615 | A | * | 7/1998 | Lipe et al. | 709/324 |
|---|---|---|---|---|---|
| 5,881,269 | A | * | 3/1999 | Dobbelstein | 703/21 |
| 5,887,168 | A | * | 3/1999 | Bahls et al. | 709/314 |
| 6,385,658 | B2 | * | 5/2002 | Harter et al. | 709/312 |
| 6,385,659 | B1 | * | 5/2002 | Tuel, Jr. | 709/313 |
| 6,421,701 | B1 | * | 7/2002 | Elnozahy | 709/100 |
| 6,493,745 | B1 | * | 12/2002 | Cherian | 709/206 |
| 6,631,394 | B1 | * | 10/2003 | Ronkka et al. | 709/100 |

OTHER PUBLICATIONS

Richter, Jeffrey, et al., , "How the Window/Application Lives and Dies", "Windows 95: A Developer's Guide", pp(4), 1995.*
International Search Report—PCT/US01/14932, Feb. 12, 2002.
Robert G. Brown: "Egineering a Beowulf–style Compute Cluster", Internet Document, Mar. 28, 2000, XP002186757 Durham, États–Unis d'Amérique p. 63, line 31–p. 64, line 8.
Von Eicken T et al: "Active Messages: A Mechanism for Integrated Communication and Computation", Proceedings of the Annual International Symposium on Computer Architecture. Gold Coast, Australia, May 19–21, 1992, New York, IEEE, US, vol. SYMP. 19, May 19, 1992, pp. 256–266, XP00032809.
The Debian Project: "Debian GNU/Linux 2.1.11 (Slink)", Software Program, [Online] Aug. 28, 1999, Internet, URL:http://www.debian.org/releases/slink, 4 pages. [retrieved on Apr. 23, 2002].
"LinuxThreads Frequently Asked Questions (with answers) [For LinuxThreads version 0.8]", Internet Document, Oct. 26, 1999, XP002138174 Internet, 18 pages.
"Linux Parallel Processing HOWTO", Internet Document [Online] Jan. 5, 1998, XP002186758 Internet, 72 pages.
L.H. Geesink: "The Coordination of Distributed Active Messages in a Dynamic Network Topology", The Computer Journal, Dec. 1991 (1991–120, XP000330331 Cambridge, Royaume–Uni, pp. 542–550.

* cited by examiner

*Primary Examiner*—St. John Courtenay, III
(74) *Attorney, Agent, or Firm*—Baker Botts L.L.P.

(57) ABSTRACT

Distributed applications in a portable thread environment are disclosed. In one embodiment, a method comprises receiving a message from a first PTE at a second PTE, wherein the message contains a destination address; determining if the message is intended for the second PTE using the PTE destination address; routing the message to a third PTE if the message is not intended for the second PTE; and executing threads associated with the message in the second PTE if the message is intended for the second PTE.

28 Claims, 9 Drawing Sheets

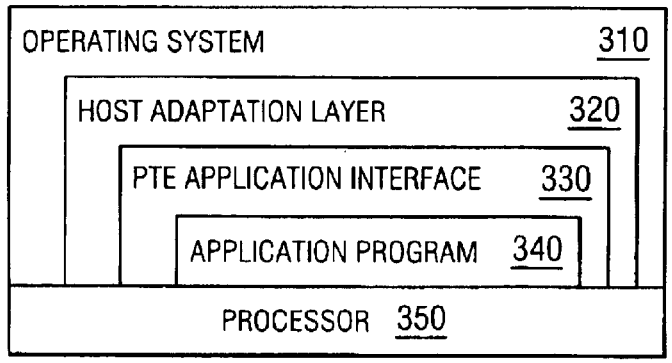
*FIG. 3*
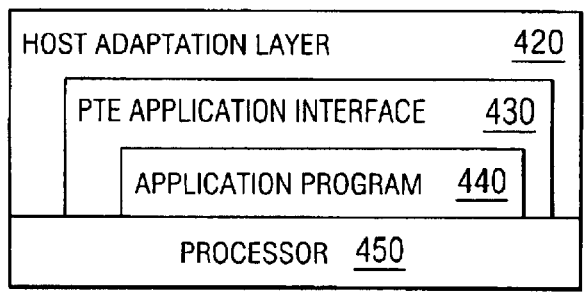
*FIG. 4*
*FIG. 5*
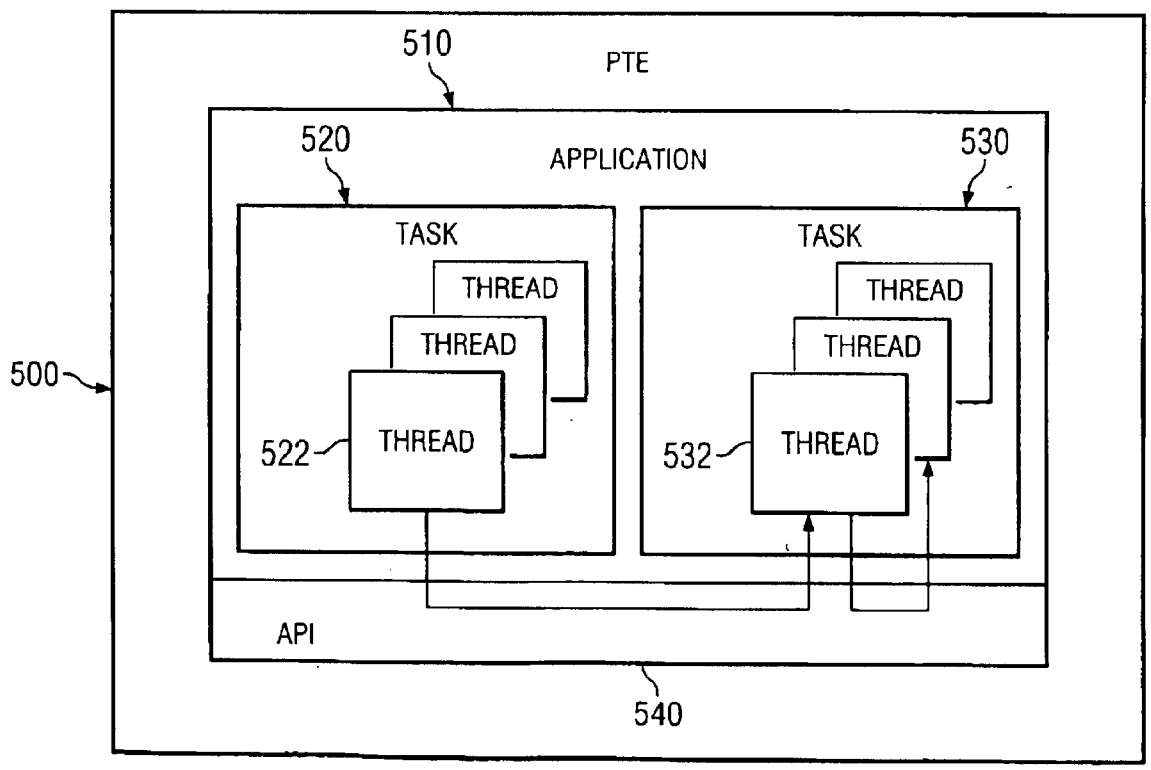

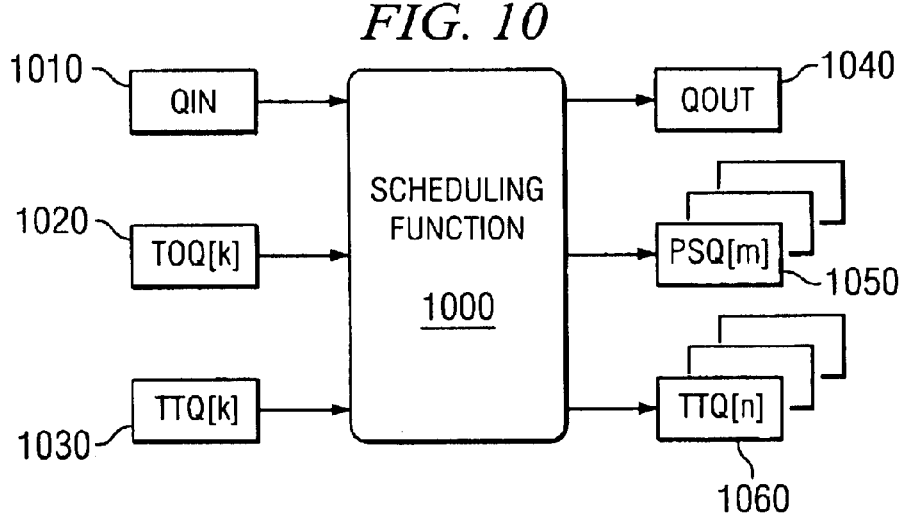
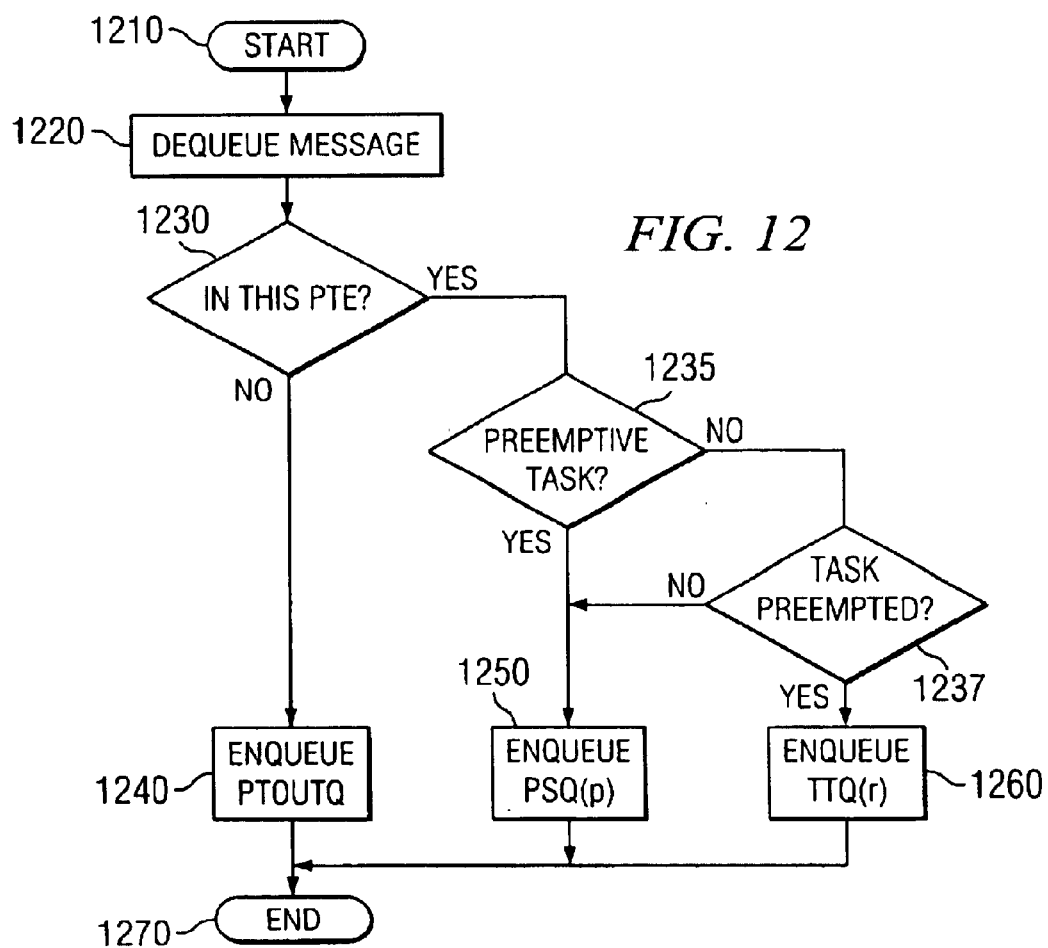

FIG. 13a

| THREAD ATTRIBUTE TABLE ||
|---|---|
| THREAD[n] | TASK ID |
| | THREAD ID |
| | THREAD PRIORITY (0-MaxPriority) |
| | TASK TYPE (PREEMPTIVE/COOPERATIVE) |

FIG. 13b

| TASK STATUS TABLE ||
|---|---|
| TASK[m] | STATUS |
| 0 | STATUS (IDLE/0...MaxPriority) |
| 1 | STATUS (IDLE/1...MaxPriority) |
| ∘<br>∘<br>∘ | ∘<br>∘<br>∘ |
| M | STATUS (IDLE/M...MaxPriority) |

FIG. 13c

| PREEMPTED TASK TABLE ||
|---|---|
| PRIORITY LEVEL | STATUS |
| 0 | STATUS (IDLE/IN-USE) |
| 1 | STATUS (IDLE/IN-USE) |
| ∘<br>∘<br>∘ | ∘<br>∘<br>∘ |
| MAX-PRIORITY | STATUS (IDLE/IN-USE) |

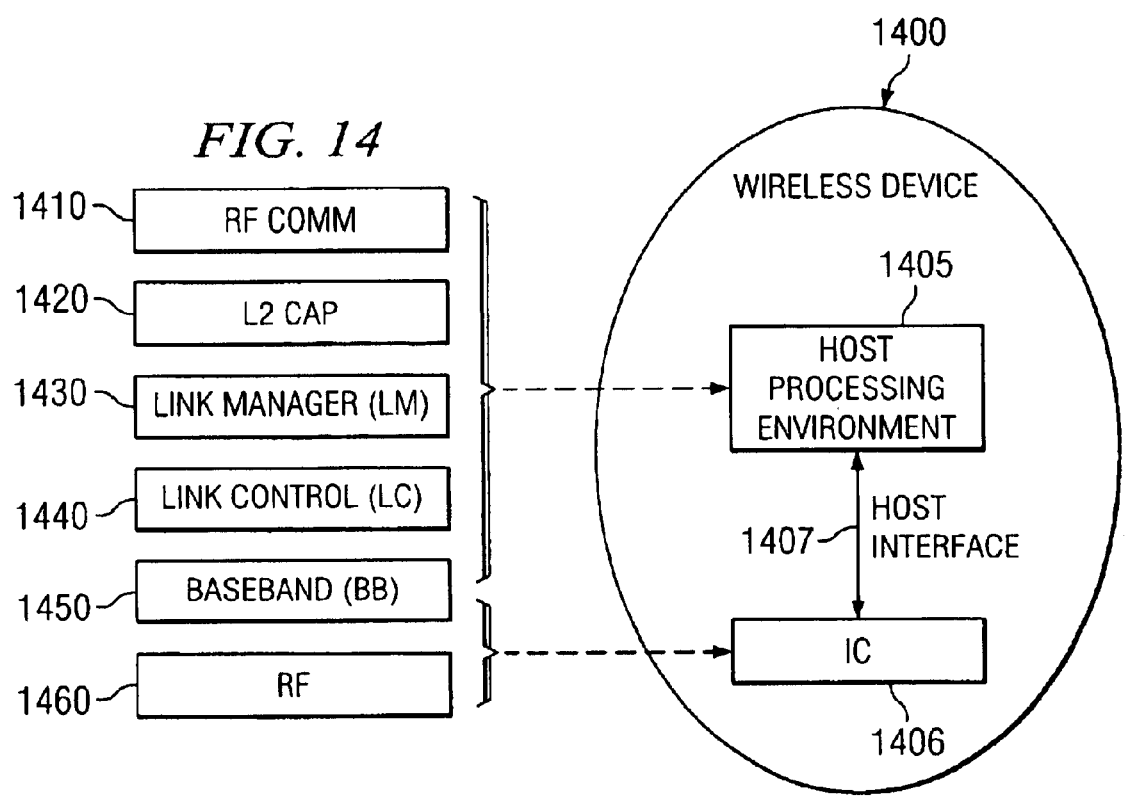

DISTRIBUTED APPLICATIONS IN A PORTABLE THREAD ENVIRONMENT

PRIORITY

This application claims the benefit of U.S. Provisional Application No. 60/202,735, filed May 8, 2000. This application is a continuation-in-part of U.S. patent application Ser. No. 09/792,550 filed on Feb. 23, 2001.

BACKGROUND OF THE INVENTION

1. Field of the Invention

This invention relates generally to the field for software design; and, more particularly, to distributed application in an application environment for supporting portable, embedded, concurrent, and/or real-time applications.

2. Description of the Related Art

The term "application" is commonly used to refer to the objective or problem for which the software, or "application program," is a solution. The form of the solution—the application program—is dependent, in part, on the configuration of the hardware on which the software is executed and, in part, on the other programs that may be executing in concert with the application program.

An application program is typically translated from an instruction set derived from one of several well-known programming languages to an instruction set closely reflecting the capabilities of processor executing the application program. This translation is accomplished by programs generally know as "compilers," "assemblers" or "interpreters." These programs translate the application program's original instructions to a set of instruction typically know as "machine code" for which there is a one-to-one correspondence between machine code instructions and the unitary operations the machine (or processor) is able to perform. Typically, machine code instructions are dependent on the machine's central processing unit (or CPU). The operation of these and similar programs are well known to those of ordinary skill in the art.

Application programs are frequently executed simultaneously with other application programs, sharing (and sometimes competing for) the resources of the host hardware.

Application programs must also frequently share the resources of the host hardware with "interrupts service routines" (ISR). These ISRs are typically short program segments that interrupt the normal program instruction sequence and execute, substantially immediately, in response to a hardware signal (an "interrupt") to the CPU.

Application programs may be invoked by, or may invoke, the services of other sets of programs running on the host that are collectively know as an "operating system." Operating system programs are typically responsible for controlling the allocation of the host's resources, including access to the host machine's data stores, central processing unit, and input/output devices. One aspect of controlling the allocation of a host's resources typically involves insuring that no two applications, ISRs, or portions of the same application try to control a resource at the same time. A number of techniques for preventing this are well know in the art, including semaphores, counting semaphores, mutexes, signals, and critical sections. A critical section is a portion of a program that, once started, is uninterruptible and executes continuously without allowing other programs to run until the critical section has ended.

Application software is executed within some "host environment," defined collectively by the host machine's hardware (including, possibly, application-specific support hardware such as an application-specific integrated circuit or "ASIC") and operating system.

Commonly, commercial application software vendors are required to adapt, or "port," their application programs to run in a multiple heterogeneous host environments. These environments may differ in their CPU's, choice of operating systems, and application-specific hardware. In order to port an application program from one host environment to another, it is typically necessary to account for any or all of these differences.

The tradition approach to porting applications is to write the application program in a "high-level language" that hopefully can be recompiled to generate machine code that can run within any of the prospective processors. While this "traditional approach" solves the portability problem at the machine code level, it is only partly addresses the application portability problem. It is also necessary to account for differences in the host environment's operating system and application-specific support hardware. For example, each operating system defines a unique application programming interface ("API") which application programs use to access the operating systems services. Because these APIs are unique, portions of the application program having access to the operating system's API must be rewritten when the application program is ported to a new operating system. In addition, accounting differences in application-specific support hardware (circuits that are able to perform a portions of the application's function that otherwise have to be performed in software) also may require that some portion of the application software be rewritten.

A problem with the traditional porting method is that this method requires that at least some portion of the application program be rewritten. This is a potentially costly and error-prone process. Because there is a likelihood of introducing unintentional errors whenever the application program is altered, this method mandates that the application developer bare the additional expense of re-testing the application after the indicated changes are complete.

More significantly, and despite the availability of a number of commercially operating systems, most embedded applications are deployed today are in host environments that supply no operating system services. Thus, for application portability, a means must be provided to ensure application software can operate correctly isolated from the vagaries of its host environment.

SUMMARY OF THE INVENTION

Distributed applications in a portable thread environment are disclosed. In one embodiment, a method comprises receiving a message from a first PTE at a second PTE, wherein the message contains a destination address; determining if the message is intended for the second PTE using the PTE destination address; routing the message to a third PTE if the message is not intended for the second PTE; and executing threads associated with the message in the second PTE if the message is intended for the second PTE.

BRIEF DESCRIPTION OF THE DRAWINGS

A better understanding of the present invention can be obtained from the following detailed description in conjunction with the following drawings, in which:

FIG. 3 illustrates one embodiment of a portable thread environment (a PTE application interface and a host environment interface layer) and its relationship to an application program and a host environment including an operating system.

FIG. 4 illustrates an embodiment of a portable thread environment implemented without an embedded operating system.

FIG. 5 illustrates two tasks communicating through a portable thread application programming interface.

FIG. 10 illustrates a scheduling function according to one embodiment communicating with various system queues.

FIG. 12 illustrates message routing logic according to one embodiment of the invention.

FIG. 13a illustrates a thread attribute table according to one embodiment of the invention.

FIG. 13b illustrates a task status table according to one embodiment of the invention.

FIG. 13c illustrates a preempted task table according to one embodiment of the invention.

FIG. 14 illustrates a wireless protocol stack implemented using one embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Embodiments of the invention described below seek to avoid the problems associated with porting application software by creating a portable environment in which an application can be moved from one host environment to another unchanged.

Embodiments of the Invention

PTE Overview

Figure 1:
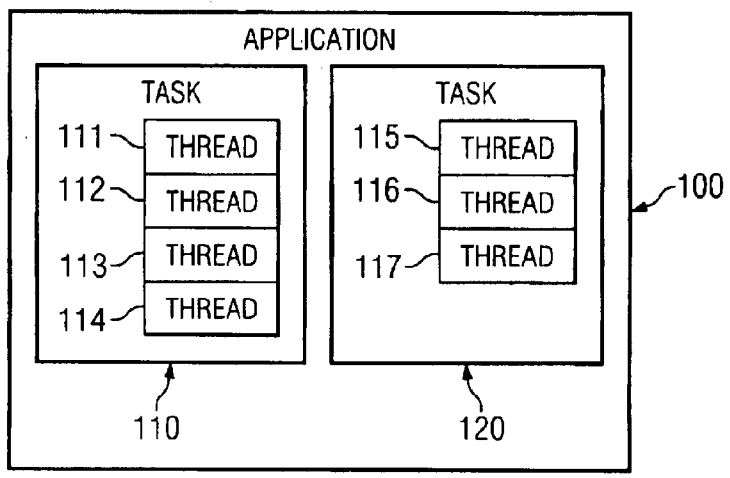
FIG. 1 illustrates an application having two tasks, one task comprised of four threads and the other task comprised of three threads.

As illustrated in FIG. 1, in one embodiment, an application 100 is constructed as a series of short, sequentially executed program fragments, referred to herein as "threads" 111–117. Each thread 111–117 is assigned to a logical grouping called a "task" 110, 120. For example, in FIG. 1, threads 111–114 are grouped within task 110 and threads 115–117 are grouped within task 120. In general, tasks may be used to partition an application into one or more sub-units, each accomplishing a specific function. An application may be subdivided into any number of tasks and each task may contain any number of threads.

Figure 2:
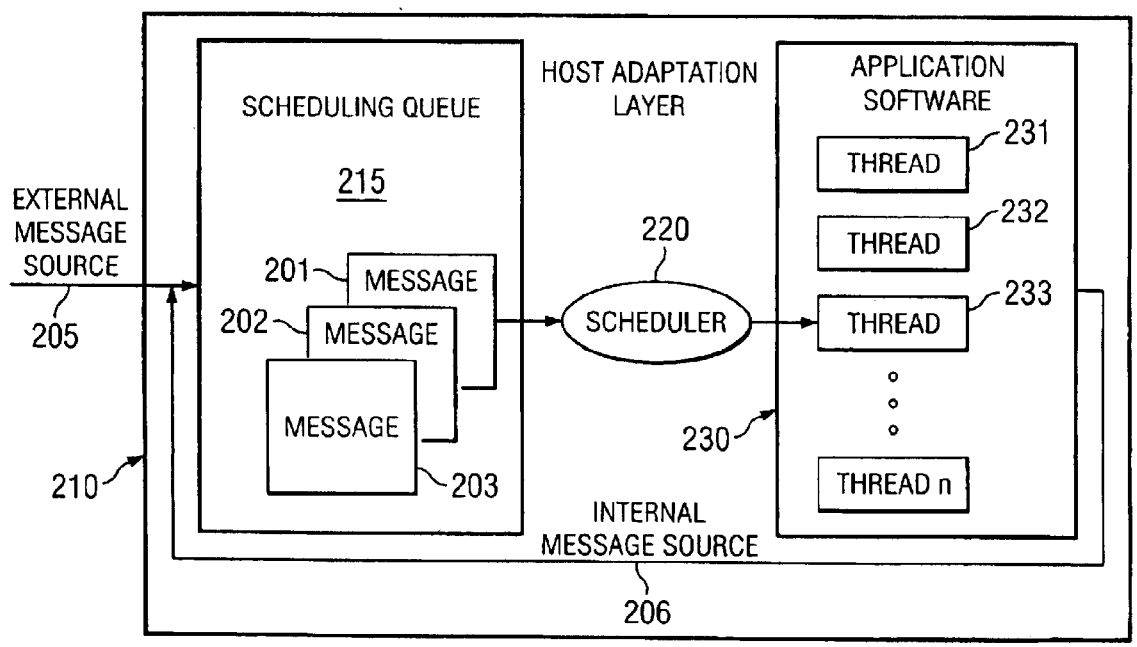
FIG. 2 illustrates message flow between a scheduling queue, a scheduler, and various threads according to one embodiment of the invention.

As illustrated in FIG. 2, one embodiment of the invention includes a Portable Thread Environment ("PTE") which is comprised generally of a scheduler 220, one or more scheduling queues 215, and a host adaptation layer 210.

The scheduling queue 215 accepts messages from executing threads (e.g., internal message source 206) and/or from sources external to the PTE (e.g., external message source 205). Each PTE-supported message is tagged with a code (e.g., a value or name) uniquely identifying a thread to which that message is to be delivered.

In one embodiment, threads are executed by the PTE scheduler 220 in a sequence determined by scheduling variables such as, for example, the message order in the PTE scheduling queue 215, and/or the priority of messages stored in the queue 215. The scheduling queue 215 in one embodiment is a list formed as messages are received from internal sources 206 such as running threads and from external sources 205 with which the application interacts. One example of an external message source is application-specific support hardware found the host environment.

Threads which are members of the same task may share information through common memory stores or by passing messages between themselves. By contrast, in one embodiment, threads which are members of different tasks may exchanges data only by sending messages.

The task grouping is designed (in part) to support the use of application-specific support hardware in an application's design. When an application is designed, the functions which are to be supported by application-specific hardware are modeled in the form of one or more tasks. When the application-specific circuits are subsequently incorporated into the design, the tasks are removed from the application software 230 (i.e., they are provided by the application-specific circuit).

The host adaptation layer 210 in one embodiment ensures that messaging between threads in different tasks is identical to the messaging between threads and an application's support hardware. In other words, the application programming interface ("API") used by the application is consistent, regardless of whether application-specific circuits are involved. The inclusion of an application-specific circuit, therefore, does not require modifications to the underlying application code (in one embodiment only an small amount of code in the host adaptation layer 210 is modified). As such, in this embodiment the application is effectively shielded from the host environment.

As illustrated in FIG. 3, in one embodiment, all interactions between the application program 340 and the host's operating system 310 occur through the PTE application interface 330 and the host adaptation layer 320. When the host environment includes operating system services, the PTE is scheduled and executed as an operating system task with the PTE's application program(s) 340 contained therein. In other words, the application program(s) 340 and the operation system 310 are isolated from one-another by the host adaptation layer 320 and the PTE interface 330.

The majority of embedded applications, however, are implemented without the aid of an embedded operating system. For host environments without operating system support, the PTE and application can run in a stand-alone configuration as depicted in FIG. 4. When running stand-alone, the host adaptation layer 420 supplies any necessary hardware support (i.e., interfaces) and communicates to the internal application threads through the PTE messaging system.

FIG. 5 illustrates message transport between tasks/threads according to one embodiment of the invention in greater detail. Task 520 in this embodiment communicates with task 530 by a message exchange between thread 522 and 532, respectively. As indicated, the inter-thread message passing is accomplished via the portable thread environment API 540. Similarly, as indicated in FIG. 5, threads within the same task 530 may also communicate (e.g., pass messages) through the API 540.

Figure 6:
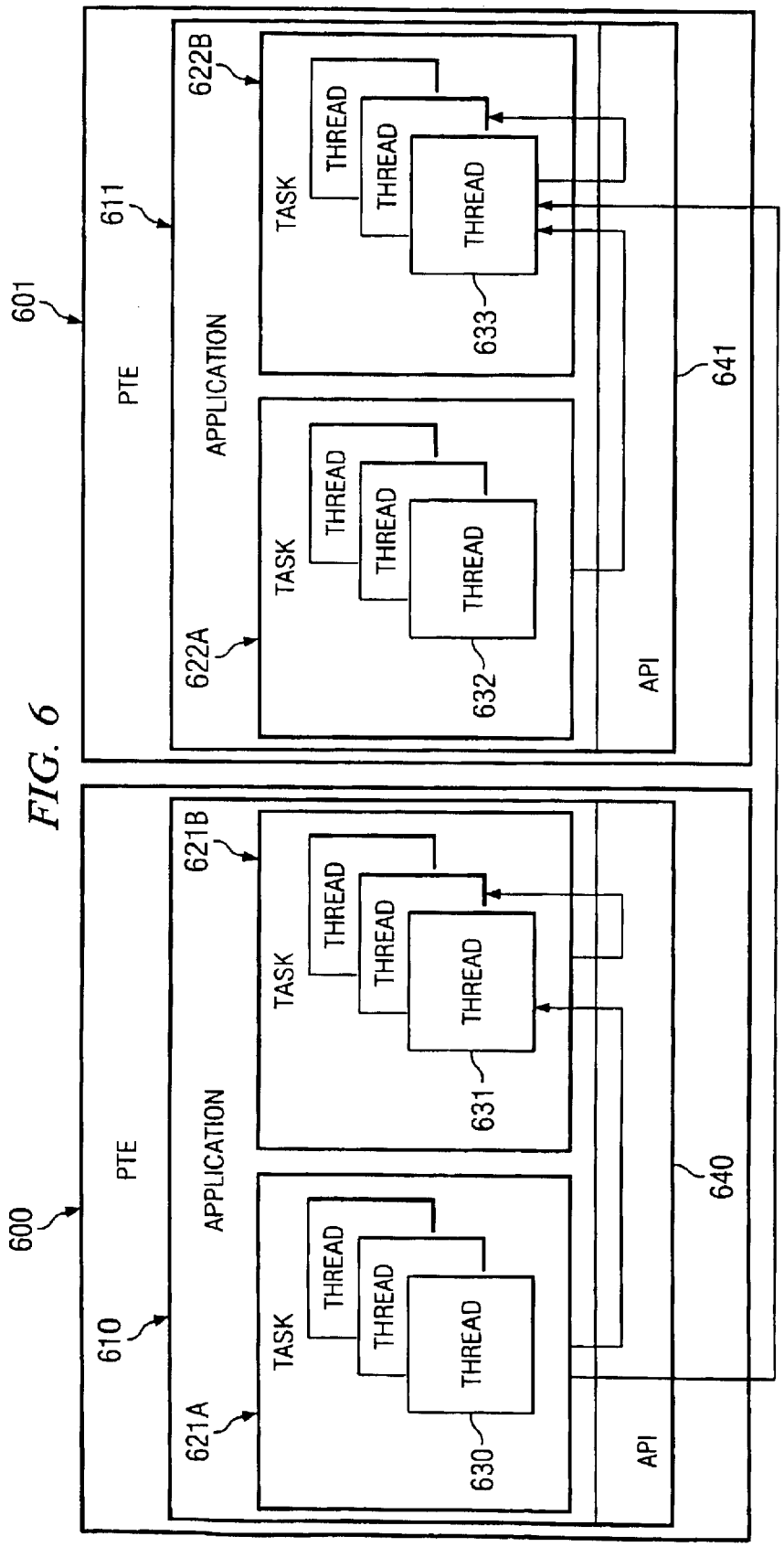
FIG. 6 illustrates two tasks residing in separate portable thread environments and communicating through an application programming interface.

As illustrated in FIG. 6, the application framework of one embodiment allows applications 610, 611 to be distributed across multiple PTEs 600 and 601, respectively. This embodiment may be particularly suited for multi-processor configurations (e.g., where each PTE 600, 601 is configured for a different processor). In one embodiment, a common API is used for both inter-PTE and intra-PTE messaging. The common API allows an application to be configured to run in either a multiprocessor environment or on a single processor by merely altering a single routing configuration file (i.e., no changes to the application are required).

Task Types and Scheduling

Figure 7:
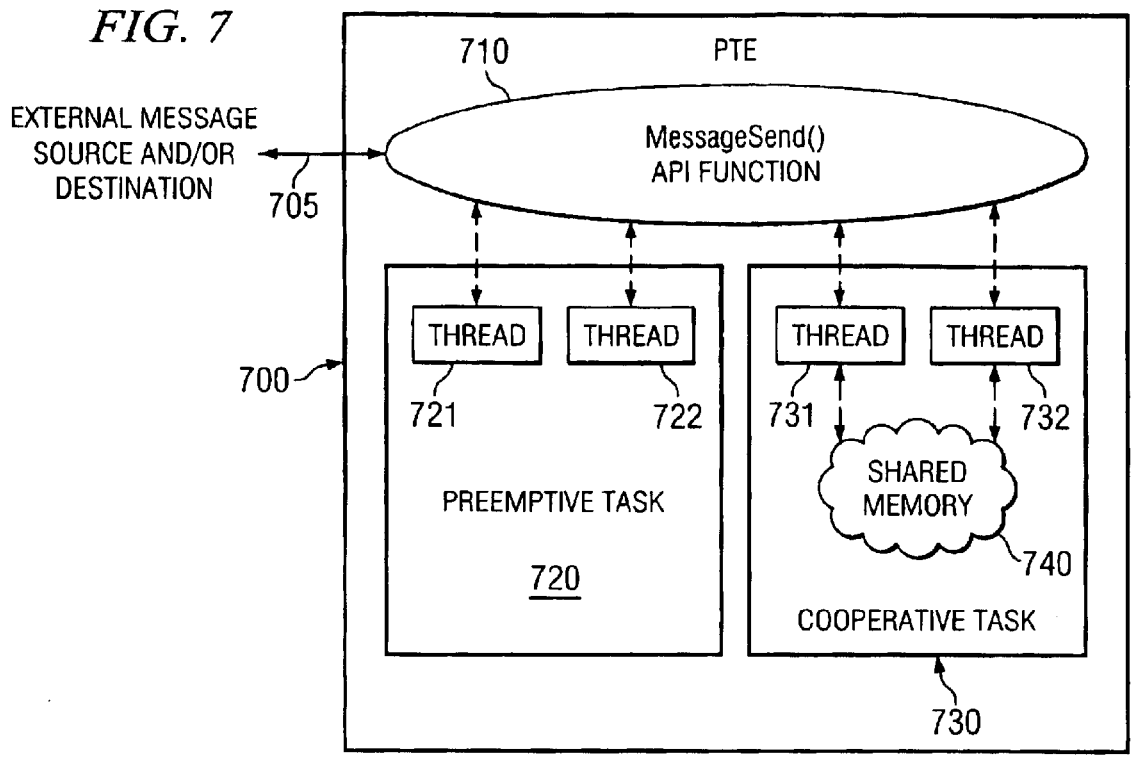
FIG. 7 illustrates a preemptive task and a cooperative task communicating with an external source and/or destination through an application programming interface.

In one embodiment, illustrated in FIG. 7, tasks are defined as either "cooperative" tasks 730 or "preemptive" tasks 720. Cooperative tasks are composed exclusively of "cooperative" threads 731, 732 while preemptive tasks are composed exclusively of "preemptive" threads 721, 722. Cooperative tasks 730 and preemptive tasks 720 differ in their ability to provide shared memory pools and other resources 740 to their constituent threads. For example, threads 731 and 732 in a common cooperative task 730 are allowed share a common memory 740. By contrast, threads 721 and 722 in a preemptive task 720 are not permitted to share resources with other threads, including threads in their own task 720. Preemptive threads 721, 722 communicate externally (e.g., with an external message source and/or destination 705) only through message passing (e.g., via an API function call 710).

Figure 8A:
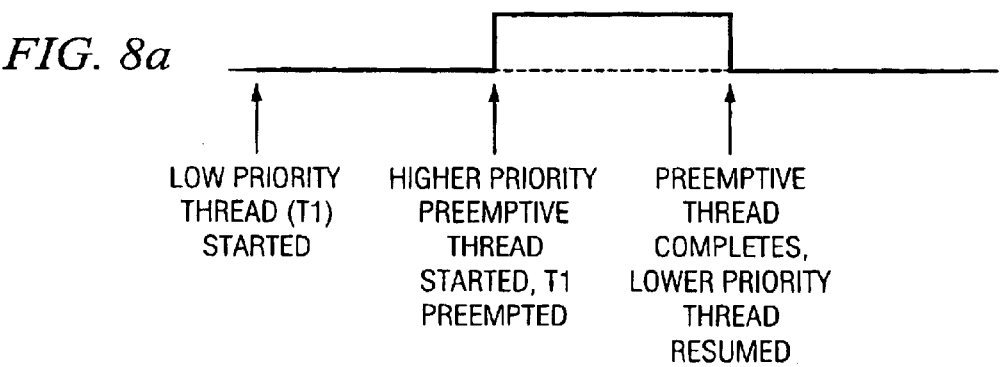
FIGS. 8a–d illustrates various examples of coordination between preemptive tasks and cooperative tasks.
Figure 8B:
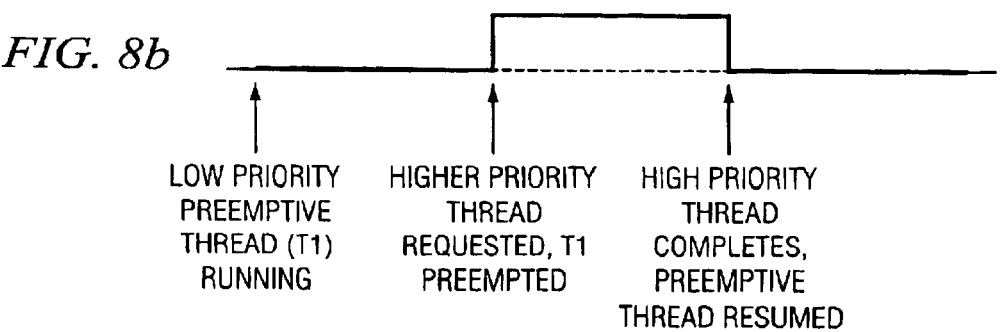
Figure 8C:
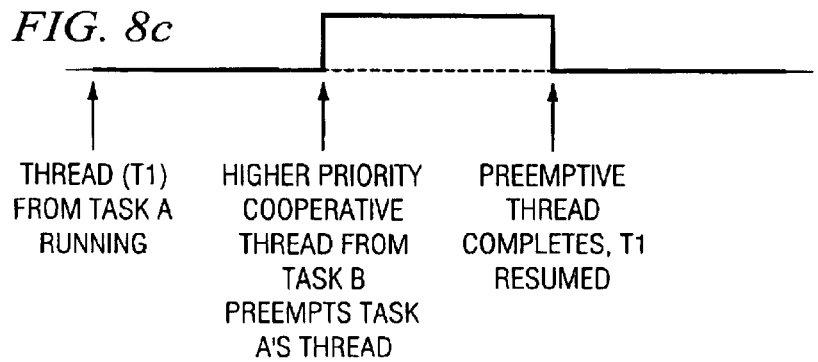

In one embodiment, all threads, both preemptive and cooperative, are individually configured to run at a specified priority level. It is not required that all threads in a task have the same priority (i.e., tasks may be composed of threads of differing priorities). In one embodiment, when a thread is requested, a message for the thread is placed in a priority-sorted FIFO queue (e.g., such as the scheduling queue 215 illustrated in FIG. 2). Normally, if the requested thread is a higher priority thread than the currently-running thread, the running thread is suspended (or "preempted") while the higher priority thread is executed. This operation is illustrated and described in FIGS. 8a through 8c.

Figure 8D:
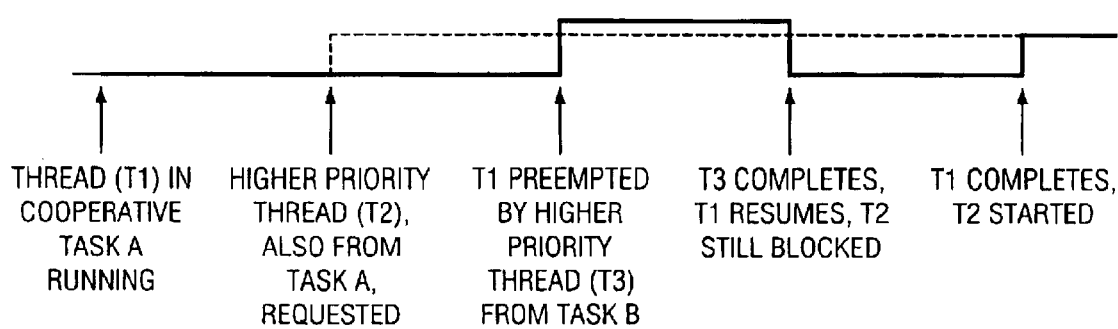

To permit resource sharing within cooperative tasks, an additional condition is placed on cooperative threads: if a cooperative thread is requested while another thread in the same task is running or preempted, the requested thread—regardless of its priority—is "blocked." That is, it is not allowed to run until the running or preempted thread in its task has completed. One example of this blocking function is illustrated and described in FIG. 8d.

In contrast to a cooperative thread, in one embodiment, the execution of a preemptive thread is not constrained by conditions other that its priority relative to other requested threads. Thus, if it is the highest priority requested thread, it is executed immediately.

Figure 9:
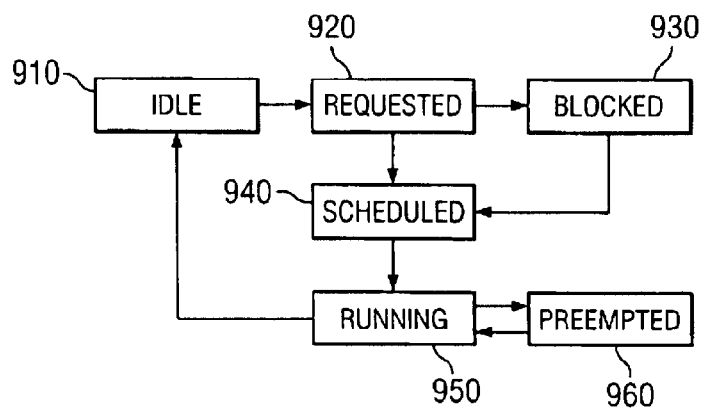
FIG. 9 illustrates various thread states according to one embodiment of the invention.

As illustrated in FIG. 9, in one embodiment, a PTE thread can exist in a variety of different states. In it's idle state 910 a thread is inactive, waiting to be requested. A thread enters the requested state 920 when it receives a message from a running thread or an interrupt service routine ("ISR"). In one embodiment, the thread remains in the requested state until the requester terminates. At that point, the requested thread is either scheduled 940 or enters a "blocked" state 930 (depending on the circumstances as described herein).

As described above, only cooperative threads can enter a blocked state 930; preemptive threads do not block. A cooperative thread is blocked if, after having been requested, a thread from its task is preempted. The thread remains blocked until all preempted threads from its task have resumed and terminated normally. In one embodiment of the PTE, cooperative thread blocking is a built-in mutual exclusion mechanism required for memory sharing between cooperative threads running at different priority levels.

A thread in a scheduled state 940 is queued, waiting for execution. Threads enter the scheduled state 940 after having been requested, after any blocking conditions have been cleared. Once scheduled, the thread cannot again be blocked. The thread will remain in the scheduling queue 940 until it is executed.

When running 950, the thread is performing the function for which it was designed. In one embodiment, only one thread may be running at a time. The thread will execute to completion unless it is preempted. The thread may enter into the preempted state 960 due to another higher priority thread(s) being scheduled (e.g., at the termination of an ISR).

Referring now to FIG. 10, in one embodiment the scheduler 1000 manages the states of an application's threads and ensures that threads are executed in the proper order by passing message requests through a series of message queues.

The PTE input queue ("QIN") 1010 receives messages read from the external environment (i.e. other PTEs) and ISRs. The scheduler may route messages from QIN 1010 to the temporary task queue ("TTQ") 1060 and/or the priority scheduling queue ("PSQ") 1050.

The PSQ 1050 includes a list of threads ready for immediate execution. The list is sorted based on scheduling variables such as, for example, thread priority and temporal order (i.e., the order in which the threads were requested). As a general rule, in one embodiment, higher priority threads are executed before lower priority threads. For threads with the same priority level, thread requests requested earlier are run before threads requested later.

Requests generated by a thread are stored in a temporary thread output queue ("TOQ") until the thread terminates. This ensures that a thread's output does not cause itself to be inadvertently preempted. In one embodiment, a separate TOQ exists for each priority level. When a thread terminates its TOQ messages are distributed to the TTQ, the PSQ or the PTE output queue ("QOUT").

The TTQ is a holding station for cooperative threads that have been requested but are not ready for scheduling because they are blocked by another active thread in their task group (as described above). This feature is necessary to ensure mutual exclusion between the members of a cooperative task with respect to the task's shared memory. In one embodiment, when the task's active thread terminates, the TTQ is emptied.

The PTE Output Queue ("QOUT") is a temporary holder for all messages leaving the PTE. For example, the QOUT receives messages from the TOQ when a thread completes its execution.

An exemplary method for scheduler operation will now be described with respect to the flowchart in FIG. 11. The scheduler is executed after the normal termination of a thread and at the termination of any ISR and on PTE startup.

When started, the scheduler initially sets the scheduler's priority variable (PRI) to the maximum priority level supported by the PTE. The scheduler (1110) reads any messages waiting for the PTE from external message sources (i.e. other possible PTEs) and copies (1111) these messages to the tail end of the PTE's input queue (QIN) in the order received. All messages (1115) in the PTE input queue (QIN) are then moved by the message routing function (1116) to either the Priority Scheduling Queue (PSQ) or to the Temporary Thread Queue (TTQ).

Next, the scheduler evaluates the entry in the Preempted Task Table (PTT) corresponding to the current value of PRI (the scheduler's priority variable). If the PTT entry indicates that the priority level is "in use", the scheduler exits immediately (1126) and resumes a preempted thread at the point where interrupted by an ISR.

If, instead, the PTT indicates that no task in running at the priority level corresponding to PRI's value, the scheduler examines the PSQ for any messages to threads with priority assignments equal to the scheduler's priority variable's value (1130). If none are found, PRI is decremented by one (1135) and if greater than zero (1120), the PTT (1125) is again examined for evidence of a preempted thread at a now lower thread priority level. The loop between 1120 to 1135 continues, thusly, until PRI is decremented to a negative value, in which case the scheduler exits (1121); PRI is decremented to the priority level of a previously preempted thread (1126), in which case the preempted thread is resumed (1126); or a message is found in the PSQ to a thread with a priority level equal to the value of PRI.

If examination of the PSQ (1130) finds a message waiting for a thread with a priority level equal to that of PRI, scheduler alters the PTT's values to indicate that the priority level of corresponding to PRI is "in use". The scheduler then extracts the message from the PSQ, starts the thread to which it is addressed (1131) and delivers the message to that thread.

When the thread ends, the scheduler routes each message (1140) created by the thread (found in the Thread Output Queue (TOQ) corresponding to the thread's priority level) to an appropriate message queues (PSQ, TTQ, or QOUT) as determined by the message router (1141). The TTQ is then scanned (1150) and messages therein are redistributed as determined by the message router (1151). Finally, each message (1160) in the output queue (QOUT) is distributed to an external PTE address by the PTE write function (1161) and the scheduler exits (1162).

Message Routing

Figure 11:
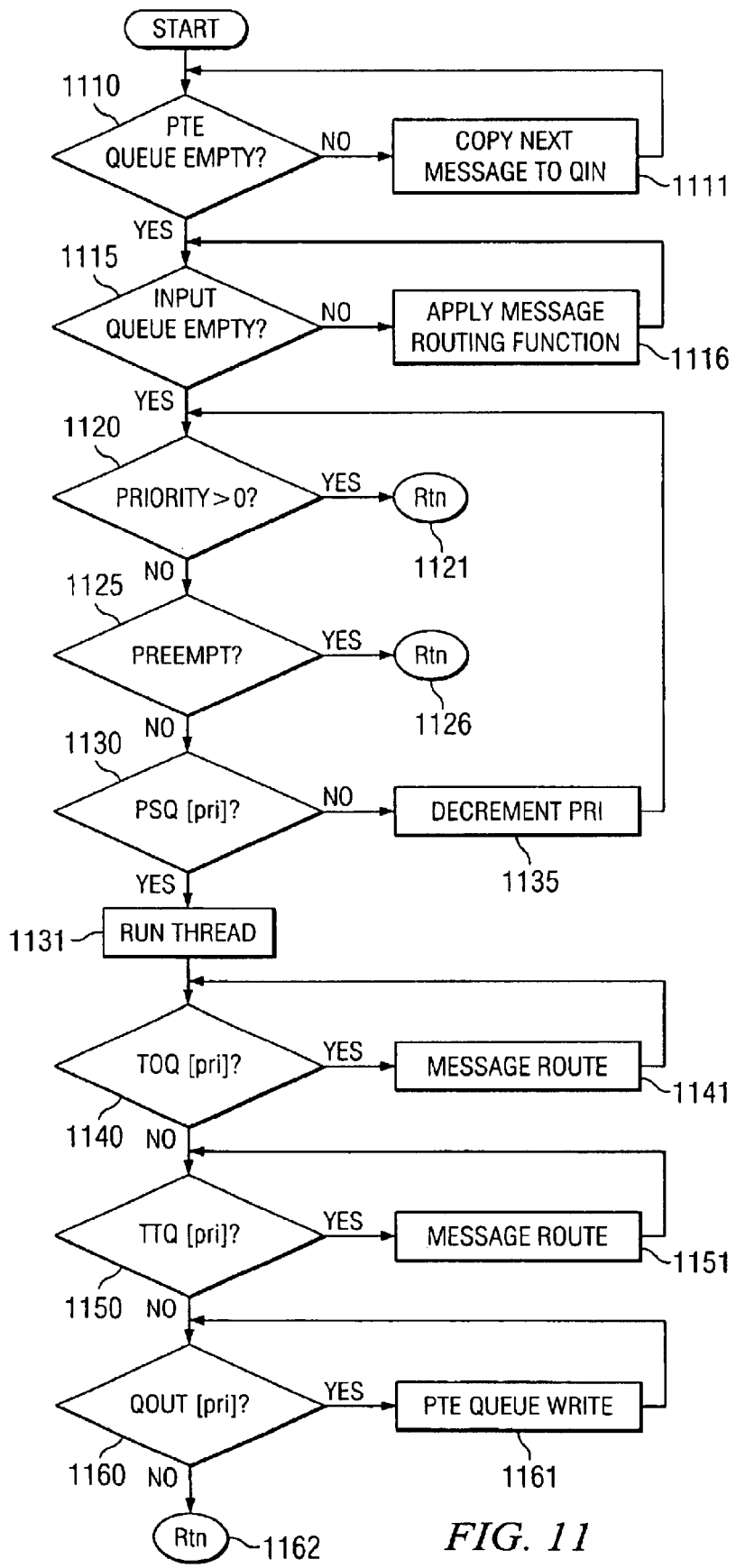
FIG. 11 illustrates scheduler operation according to one embodiment of the invention.

In one embodiment, a routing function is implemented to route thread requests throughout the PTE (e.g., at each of the decision blocks of FIG. 11). Thus, the scheduler, in a critical section, may invoke the message routing function to move messages between the PTE's various message queues. The routing function in one embodiment uses the message's thread name as a destination address for the message (in this embodiment, each message contains a header with a thread name identifying its destination).

The ultimate goal of the routing mechanism is to transfer a message from its source to a PSQ, and then to dispatch the message from the PSQ to the message's destination thread (e.g., specified by its thread name). To achieve this goal the router may pass the message through a series of intermediate queues (as described above).

One embodiment of a routing method is illustrated in FIG. 12. At 1220 the router de-queues the message from its source. Embedded within the message is a PTE destination address. PTE destination addresses are static once a PTE application is compiled. Then, at 1230, the router determines whether the message is directed to an internal PTE thread or an external thread (i.e., located in a different PTE) based on the destination address. If the destination is an external thread, then the router transfers the message to an output queue, such as QOUT (at 1240) and the routing process is complete with respect to that message (i.e., the other PTE takes over the routing function after receiving the message from the output queue). Once all threads are executed, the output queue is emptied.

If, however, the message is for an internal thread, the router then determines whether the task is a preemptive task (at 1235). If the message is for a preemptive task, it transmits the message directly to the PSQ (at 1250) at a specified priority level. If the message is for a cooperative task, then at 1237 the router determines whether any other thread from the thread's task is preempted. If no other thread from the thread's task is preempted, the router transmits the message to the PSQ at a specified priority level (e.g., specified by the thread name as described below). If another thread from the thread's task is preempted, however, the router queues the message in the TTQ at the thread's specified priority level.

In one embodiment, a thread generates a message for external execution. The message is placed in the thread's output queue. The message may be passed from one PTE to another PTE until the PTE matching the message's destination address is found. In another embodiment, the message is broadcast to every PTE at the same time. If a PTE receives one of the "broadcast" messages, and the message is not intended for that PTE, it is ignored.

In one embodiment, the router uses three tables to look up information about its tasks and/or threads. As illustrated in FIGS. 13a, 13b and 13c, these include a thread attribute table ("TAT"), a task status table ("TST"), and/or a preempted thread table ("PTT"), respectively.

In one embodiment, each thread in the PTE environment is uniquely identified by a thread "name." Thread names may be used by the router to identify information such as, for example, a message's destination thread. In addition, as illustrated in FIG. 13a, the thread name (e.g., "Thread[n]" in FIG. 13a) may be used to identify other information such as the thread's PTE, Task ID, Thread ID, Thread Priority, and Task Type.

The task ID identifies the task to which the thread belongs. The task may be internal (i.e., within the local PTE) or external. If internal, messages sent to the task are delivered though internal message queues (as described above). If external, messages are routed to the common output queue ("QOUT").

The thread ID identifies a specific thread within a task; the thread priority defines the thread's execution priority in relation to other threads (various priority levels may be implemented consistent with the underlying principles of the invention); and the task type identifies the thread's task as either preemptive or cooperative. It should be noted that although only one thread name entry is shown in FIG. 13a, the underlying principles of the invention may be implemented using TAT's with a variety of different thread name entries.

As indicated in FIG. 13b, in one embodiment, a task status table ("TST") records the priority of each task's highest priority started thread (in this context, "started" can mean running, preempted, or interrupted). If no thread within the task is running, the TST records that the task is idle. In one embodiment, the scheduler uses the TST entries to route messages directed to started cooperative threads to the proper TTQ.

In addition to the TST, the PTE keeps a table, referred to as a preempted thread table ("PTT"), that records the priority levels which are currently in use.

Wireless Implementations

In one embodiment, the PTE described herein is used to support a communications protocol stack. For example, if the system is configured to support the Bluetooth protocol, the protocol stack may be divided as illustrated in FIG. 14, with the RF layer 1460 and portions of the baseband layer 1450 programmed in a Bluetooth IC 1406 (which may be an ASIC) and the remaining layers, including certain portions of the baseband layer 1450, implemented as software executed in the host processor environment 1405. In this embodiment, tasks and threads may reside in both the Bluetooth IC 1406 and the host processing environment 1405. Each layer in the protocol stack is implemented as a separate task. Messages transmitted between tasks in the hardware portion and tasks in the software portion will occur over the host interface 1407.

In an alternate implementation of the same protocol stack, some stack layers, RFCOMM (1410) and L2CAP (1420) for example, might be executed in a second host processing environment. A PTE would be implemented in each host environment sharing a common inter-processor messaging mechanism. Within the PTE Application Interface (330) as shown in FIG. 3, protocol layers (RFCOMM and L2CAP in this case) can be moved from one host environment to the other without altering the software that implements the layer functions.

As described above, the PTE is ideal for this type of wireless communication environment because it can easily be ported from one host processing environment to another without significant modification. As previously described, applications run within a PTE are composed of tasks (groups of threads) threads which interact with the PTE through a limited number of fixed API calls. Because the API calls are invariant for all PTE instances, a Task created for one PTE can be run on any other PTE without modification, regardless of the host environment. All differences in host environments are accounted for in the Host Adaptation Layer illustrated in FIGS. 3 and 4. It is typically be necessary to change only the Host Adaptation Layer when the PTE's host is changed. The PTE's simple common communication system for messaging and synchronization enable the PTE to be implemented with very little software in most operating environments. Being relatively small (and typically a small fraction of the size of the application code it supports), the PTE can be adapted to a new host, and be proven to be operating correctly with relatively little effort. No other changes are necessary. It is important to note that the apparatus and method described herein may be implemented in environments other than a physical integrated circuit ("IC"). For example, the circuitry may be incorporated into a format or machine-readable medium for use within a software tool for designing a semiconductor IC. Examples of such formats and/or media include computer readable media having a VHSIC Hardware Description Language ("VHDL") description, a Register Transfer Level ("RTL") netlist, and/or a GDSII description with suitable information corresponding to the described apparatus and method.

Throughout the foregoing description, for the purpose of explanation, numerous specific details were set forth in order to provide a thorough understanding of the invention. It will be apparent, however, to one skilled in the art that the invention may be practiced without some of these specific details. For example, while the embodiments described above focused on the Bluetooth protocol, many of the underlying principles of the invention may be practiced using various other types of wireless and terrestrial protocols. Accordingly, the scope and spirit of the invention should be judged in terms of the claims, which follow.

What is claimed is:

1. A method, comprising:
    receiving a message from a first PTE at a second PTE, wherein the message contains a destination address;
    determining if the message is intended for the second PTE using the PTE destination address;
    routing the message to a third PTE if the message is not intended for the second PTE; and
    executing threads associated with the message in the second PTE if the message is intended for the second PTE.

2. The method of claim 1, wherein routing, comprises:
    placing the message in an output queue of the second PTE; and
    emptying the output queue once any thread being executed by the second PTE terminates.

3. The method of claim 1, wherein executing threads, comprises scheduling threads for execution by placing the threads in appropriate queues.

4. The method of claim 3, wherein scheduling threads for execution, comprises:
    routing the message to a priority scheduling queue if the message is for a preemptive task; and
    routing the message to a temporary thread queue if a preempted thread is associated with the message.

5. The method of claim 1, wherein receiving a message, comprises using a router to directly route the message from the first PTE to the second PTE.

6. The method of claim 1, wherein receiving a message, comprises broadcasting the message from the first PTE to a plurality of PTEs including the second PTE.

7. The method of claim 6, further comprising ignoring the message by a subset of the plurality of PTEs if the message is not intended for the subset of the plurality of PTEs.

8. A system, comprising:
    means for receiving a message from a first PTE at a second PTE, wherein the message contains a destination address;
    means for determining if the message is intended for the second PTE using the PTE destination address;
    means for routing the message to a third PTE if the message is not intended for the second PTE; and
    means for executing threads associated with the message in the second PTE if the message is intended for the second PTE.

9. The system of claim 8, wherein routing, comprises:
    means for placing the message in an output queue of the second PTE; and
    means for emptying the output queue once any thread are executing in the second PTE terminates.

10. The system of claim 8, wherein executing threads, comprises means for scheduling threads for execution by placing the threads in appropriate queues.

11. The system of claim 10, wherein scheduling threads for execution, comprises:

means for routing the message to a priority scheduling queue if the message is for a preemptive task; and means for routing the message to a temporary thread queue if a preempted thread is associated with the message.

12. The system of claim 8, wherein receiving a message, comprises means for using a router to directly route the message from the first PTE to the second PTE.

13. The system of claim 8, wherein receiving a message, comprises means for broadcasting the message from the first PTE to a plurality of PTEs including the second PTE.

14. The system of claim 13, further comprising means for ignoring the message by a subset of the plurality of PTEs if the message is not intended for the subset of the plurality of PTEs.

15. A computer-readable medium having stored thereon a plurality of instructions, said plurality of instructions when executed by a computer, cause said computer to perform:

receiving a message from a first PTE at a second PTE, wherein the message contains a destination address;

determining if the message is intended for the second PTE using the PTE destination address;

routing the message to a third PTE if the message is not intended for the second PTE; and executing threads associated with the message in the second PTE if the message is intended for the second PTE.

16. The computer-readable medium of claim 15 having stored thereon additional instructions, said additional instructions when executed by a computer for routing, cause said computer to further perform:

placing the message in an output queue of the second PTE; and emptying the output queue once any thread executing on the second PTE terminates.

17. The computer-readable medium of claim 15 having stored thereon additional instructions, said additional instructions when executed by a computer for executing threads, cause said computer to further perform scheduling threads for execution by placing the threads in appropriate queues.

18. The computer-readable medium of claim 16 having stored thereon additional instructions, said additional instructions when executed by a computer for scheduling threads for execution, cause said computer to further perform:

routing the message to a priority scheduling queue if the message is for a preemptive task; and routing the message to a temporary thread queue if a preempted thread is associated with the message.

19. The computer-readable medium of claim 15 having stored thereon additional instructions, said additional instructions when executed by a computer for receiving a message, cause said computer to further perform using a router to directly route the message from the first PTE to the second PTE.

20. The computer-readable medium of claim 15 having stored thereon additional instructions, said additional instructions when executed by a computer for receiving a message, cause said computer to further perform ignoring the message by a subset of the plurality of PTEs if the message is not intended for the subset of the plurality of PTEs.

21. The computer-readable medium of claim 20 having stored thereon additional instructions, said additional instructions when executed by a computer, cause said computer to further perform ignoring the message by a subset of the plurality of PTEs if the message is not intended for the subset of the plurality of PTEs.

22. A system, comprising:

a first apparatus running a first PTE; and a second apparatus running a second PTE, wherein the second apparatus
is networked to the first apparatus,
receives a message from the first apparatus that contains a destination address,
determines if the message is intended for the second PTE using the destination address,
routes the message to a third apparatus having a third PTE if the message is not intended for the second PTE, and
executes threads associated with the message if the message is intended for the second PTE.

23. The system of claim 22, wherein the second apparatus when routing the message to the third apparatus places the message in an output queue of the second PTE; and empties the output queue once any thread executing in the second PTE terminates.

24. The system of claim 22, wherein the second apparatus when executing threads schedules threads for execution by placing the threads in appropriate queues.

25. The system of claim 24, wherein the second apparatus when scheduling threads for execution:

routes the message to a priority scheduling queue if the message is for a preemptive task; and routes the message to a temporary thread queue if a preempted thread is associated with the message.

26. The system of claim 22, further comprising:

a router configured to directly route the message from the first PTE to the second PTE.

27. The system of claim 21, wherein the first apparatus broadcasts the message to a plurality of apparatus including the second apparatus.

28. The system of claim 27, wherein a subset of the plurality of apparatus ignore the message if the message is not intended for the subset of the plurality of apparatus.

* * * * *